March 10, 1953    M. COPUS    2,631,007
COMBINED RAMP BLOCK AND AUTO JACK
Filed May 20, 1949
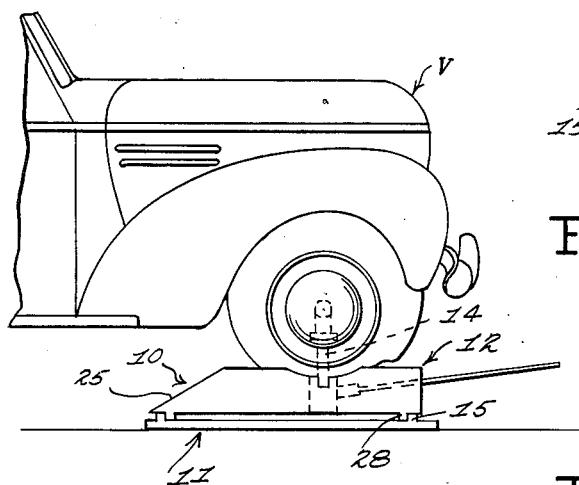
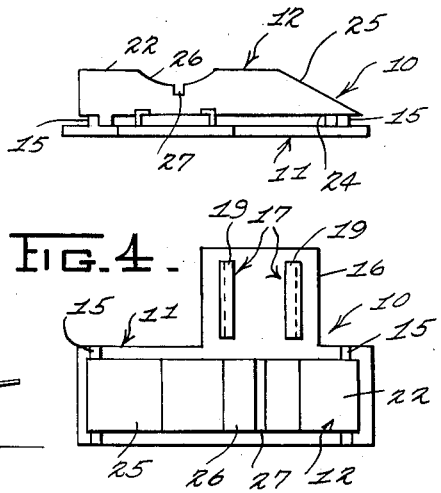
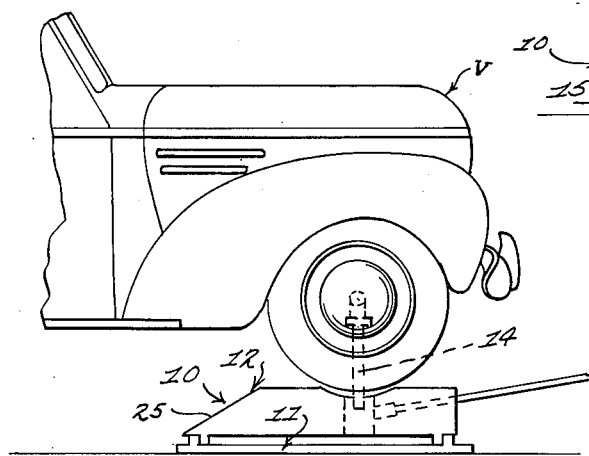
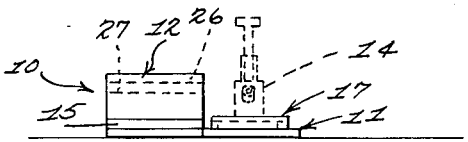
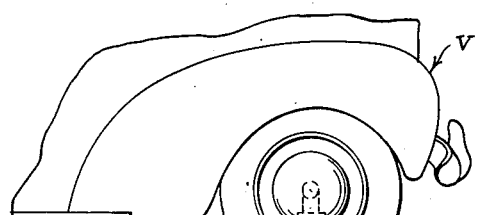
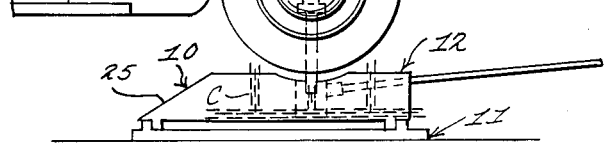
INVENTOR.
MATTHEW COPUS
BY
McMorrow, Berman & Davidson
ATTORNEYS

Patented Mar. 10, 1953

2,631,007

UNITED STATES PATENT OFFICE 2,631,007

COMBINED RAMP BLOCK AND AUTO JACK

Matthew Copus, Uniontown, Pa., assignor of one-half to William T. Guseman, Uniontown, Pa.

Application May 20, 1949, Serial No. 94,400

1 Claim. (Cl. 254—88)

This invention relates to a novel combination auto jack, and more particularly to a riser block for lifting a wheel of an automobile, a jack for supporting the lifted wheel in its raised position, and means for centering or positioning the jack in proper supporting relation to the wheel.

It is an object of this invention to provide a combination auto jack of the kind to be more particularly described hereinafter which may be used in mud, snow or sand and on icy roads for securely supporting a wheel of the automobile while the tire is being removed.

Another object of this invention is to provide a combination jack and ramp block of this kind for securely supporting a raised position of an automobile while the wheel or tire is being removed or changed in a manner to overcome the danger of the swinging and swaying of a vehicle as supported by a bumper jack.

A further object of this invention is to provide a combination jack and ramp block of this kind having provision for readily applying an anti-skid chain about a tire or wheel while mounted on the vehicle.

With the above and other objects in view, my invention consists in the novel structure, combination and arrangement of details as set forth in the following description and drawings, and then more particularly pointed out in the appended claim.

In the drawings:

Figure 1 is a side elevation of the front end of an automobile, partly broken away, supported on the ramp block of a combination jack constructed according to an embodiment of my invention;

Figure 2 is a side elevation of the automobile supported in a raised position on the new jack;

Figure 3 is a side elevation of the jack removed from under the automobile;

Figure 4 is a top plan view of the base plate and ramp block shown in Figure 3;

Figure 5 is a front elevation of the jack shown in dotted lines mounted on the base plate adjacent the ramp block;

Figure 6 is a perspective view of the separated ramp block and supporting plate;

Figure 7 is a side elevation of the combination jack as employed for engaging chains on the wheels of a vehicle.

Referring to the drawings, the numeral 10 designates generally a novel combination auto jack and support constructed according to an embodiment of my invention for supporting a wheel or corner of a vehicle while the wheel is to be changed or a tire removed. The jack 10 is formed of light metal, wood or other suitable material sufficiently strong to support the vehicle and formed in a manner whereby the car may be driven onto the ramp block forming a part thereof. The combination jack 10 is particularly adapted to be carried about in the trunk or other portion of the vehicle V to be used in emergencies, as on the road, or at other places where more suitable emergency or vehicle-lifting equipment is not available.

The combination jack 10 is formed of an elongated flat base plate 11 which is adapted to be rested on the ground under the wheel W of the vehicle for supporting the ramp block 12 and jack 14. The plate 11 is substantially the width of the normal tires on conventional passenger vehicles or automobiles, though it may be wider to provide a firm and solid support. A transverse stop member 15 is fixed to or formed on each end of the plate 11 transversely thereof and rising therefrom, for supporting the ramp block 12 in a manner to be more particularly described hereinafter. An inwardly-extending arm 16 is formed on one side of the base plate 11 providing a base or support on which the jack 14 will be positioned under the axle of the car inwardly of the wheel to be supported. A pair of elongated channel members 17 are secured on the upper side of the arm 16 in confronting relation one to the other for slidably supporting the bottom or base plate of the jack 14 for sliding motion transversely of the base plate 11. Each channel member 17 is formed as an angle bar having an upwardly-extending vertical arm 18 and an inwardly-extending horizontal arm 19 on the upper edge of the vertical arm. The horizontal arms 19 of the pair of members 17 are disposed in confronting, inwardly-extending relation, defining therebetween a channel 20.

The ramp block 12, formed also of wood, metal or other suitable material is adapted to be seated on the base plate 11 and is formed for lifting the wheel of a car as it is driven upon it. The ramp block 12 is formed of a basically rectangular block 21 having a flat upper surface 22 and a bottom wall or side 24. The rear end of the block 12 is formed with an inclined ramp surface 25 extending downwardly and rearwardly from the rear end of the top surface 22 to the rear edge of the bottom wall or side 24. An arcuate recess 26 is formed on the top side 22 intermediate the length thereof and extending transversely for seating therein the periphery of a tire on the wheel to be lifted. The recess 26 opens outwardly through the side wall of the block 12 substantially in alignment with the bar or arm 16, which will then be positioned substantially in a vertical plane through the hub and axle of the wheel. A transverse slot 27 is formed in the bottom of the arcuate recess 26 for seating therein a cross-chain of a tire chain C to be applied to the tire on the wheel.

A pair of depending lugs or stop elements 28 are fixed to or formed on the bottom wall 24 of the block 12 and are adapted to slidably engage the inner, confronting sides of the stop elements 15 on the base plate 11. The spaced-apart lugs 28 are positioned on the block 12 in a manner to provide for the free sliding movement of the ramp block 12 transversely of the plate 11, while firmly holding the ramp block against sliding movement longitudinally on the base plate 11.

In the use and operation of the combination jack 10, described above, for use in changing a wheel or tire, the ramp block 12 is positioned on the plate 11 in the manner shown in Figures 3 to 5 of the drawings with the lugs 28 engaging the inner sides of the lugs 15 on the base plate 11. The base or base flange of the jack element or member 14 formed in the manner of a conventional screw or hydraulic jack is slidably engaged in the confronting guide members, the jack 14 being disposed in its lowermost position or at least suitably low below the axle of the car to be lifted. The wheel of the automobile is then rolled up the ramp 25, as by driving the car forwardly, and seated in the recess 26. At this point, the jack 14 is raised, engaging the axle or other wheel suspension member for lifting the wheel out of the recess 26 to a clear, weight-sustaining position thereabove as shown in Figure 2. The ramp block 12 may now be slidably removed from under the wheel and from engagement on the base plate 11 to provide suitable working space for removing the wheel after removal of the necessary lug nuts or bolts.

When another wheel or tire is applied in position, it will not be necessary to put the ramp block 12 back on the plate 11, as the properly inflated tire will hold the axle suitably high to permit the removal of the jack 14 after it has been lowered only a short distance. After the removal of the jack 14, by sliding it from the channels 17, the car may be driven off of the plate 11 and the entire unit may be stored in the trunk of the car or other suitable storage space.

When used for applying anti-skid chains on the wheels, the chains C are laid out in alignment with the base plate 11 with one cross-chain engaged in the slot or groove 27 of the ramp block 12. The jack 14 is not at this time used, but the wheel is driven onto the block 12, until seated in the recess 26, over the groove 27, whereat the chain may be lifted from the opposite ends of the block and secured about the wheel.

It will be obvious from the foregoing detailed description of one embodiment of this invention that various changes in details, structure and arrangement may be made without departing from the spirit and scope of this invention as pointed out in the appended claim.

I claim:

A combination jack comprising a single flat horizontal base plate to rest upon the ground, said base plate having a top, longitudinally spaced stop members rising from the top of said base plate and extending thereacross, said base plate having a jack supporting arm extending from one side thereof at a point intermediate said stop members, said arm having jack mounting means thereon, a ramp block supported on said base plate out of contact with the ground, said ramp block having depending longitudinally spaced lugs freely resting upon the top of said base plate and adjacent the sides of said stop members, said lugs extending across the under side of said ramp block and spaced to engage said stop members whereby said ramp block can be slidably removed sidewise from said base plate but is held against longitudinal movement relative to said base plate while resting thereon, a ramp on an end of said ramp block, said ramp block being formed between its ends with a wheel receiving recess, said recess being aligned with said jack supporting arm and jack mounting means.

MATTHEW COPUS.

REFERENCES CITED

The following references are of record in the file of this patent:

UNITED STATES PATENTS

| Number | Name | Date |
|---|---|---|
| 1,872,959 | Johnson et al. | Aug. 23, 1932 |
| 2,321,602 | Jensen | June 15, 1943 |
| 2,533,981 | Weaver | Dec. 12, 1950 |